(12) United States Patent
Bikson

(10) Patent No.: US 11,738,302 B1
(45) Date of Patent: Aug. 29, 2023

(54) METHOD OF GENERATING RENEWABLE NATURAL GAS

(71) Applicant: Unconventional Gas Solutions, LLC, Houston, TX (US)

(72) Inventor: Benjamin Bikson, Newton, MA (US)

(73) Assignee: Unconventional Gas Solutions, LLC, Houston, TX (US)

( * ) Notice: Subject to any disclaimer, the term of this patent is extended or adjusted under 35 U.S.C. 154(b) by 0 days.

(21) Appl. No.: 18/155,374

(22) Filed: Jan. 17, 2023

(51) Int. Cl.
*B01D 53/14* (2006.01)
*B01D 53/18* (2006.01)

(52) U.S. Cl.
CPC ..... *B01D 53/1406* (2013.01); *B01D 53/1431* (2013.01); *B01D 53/1468* (2013.01); *B01D 53/1475* (2013.01); *B01D 53/1487* (2013.01); *B01D 53/18* (2013.01); *B01D 2256/245* (2013.01); *B01D 2257/104* (2013.01); *B01D 2257/304* (2013.01); *B01D 2257/504* (2013.01); *B01D 2257/556* (2013.01); *B01D 2257/702* (2013.01); *B01D 2257/80* (2013.01)

(58) Field of Classification Search
CPC ............ B01D 53/1406; B01D 53/1431; B01D 53/1468; B01D 53/1475; B01D 53/1487; B01D 53/18; B01D 2256/245; B01D 2257/104; B01D 2257/304; B01D 2257/504; B01D 2257/556; B01D 2257/702; B01D 2257/80; B01D 53/22
See application file for complete search history.

(56) References Cited

U.S. PATENT DOCUMENTS

| | | | |
|---|---|---|---|
| 4,077,779 A | 3/1978 | Sircar et al. |
| 4,421,535 A | 12/1983 | Mehra |
| 4,770,676 A | 9/1988 | Sircar et al. |
| 4,857,083 A | 8/1989 | DiMartino |
| 6,929,680 B2 | 8/2005 | Krushnevych et al. |
| 7,442,233 B2 | 10/2008 | Mitariten |
| 8,282,707 B2 | 10/2012 | Bresler et al. |
| 8,454,727 B2 | 6/2013 | Dunne et al. |
| 8,999,038 B2 | 4/2015 | Ungerank et al. |
| 2004/0099138 A1 | 5/2004 | Karode |

OTHER PUBLICATIONS

R. Baker et al. "Natural Gas Processing with Membranes: An Overview", Ind. Eng. Chem. Res. 2008, 47, 2109-2121.
B.D. Bhide et al., "Hybrid processes for the removal of acid gases from natural gas", Journal of Membrane Science 140 (1998) 27-49.
(Continued)

*Primary Examiner* — Christopher P Jones
*Assistant Examiner* — Phillip Y Shao
(74) *Attorney, Agent, or Firm* — Forge IP, PLLC

(57) ABSTRACT

A method for generating Renewable Natural Gas (RNG) from raw biogas is disclosed, in which carbon dioxide is removed from biogas to generate pipeline specification RNG by a combination of absorption and membrane processes. The absorption process provides for the initial bulk carbon dioxide removal. The membrane process provides for the simultaneous removal of carbon dioxide and water vapors to pipeline specification. The method is characterized by a reduced separation energy consumption as compared to stand-alone membrane and absorption unit separations for biogas upgrading.

14 Claims, 3 Drawing Sheets

(56) References Cited

OTHER PUBLICATIONS

Anjan K. Datta et al., "Optimization of membrane unit for removing carbon dioxide from natural gas"; Journal of Membrane Science 283 (2006) 291-300.
William Echt, "Hybrid Systems: Combining Technologies Leads to More Efficient Gas Conditioning", 2002 Laurance Reid Gas Conditioning Conference.
Brice Freeman et al., "Hybrid membrane-absorption CO2 capture process", Energy Procedia 63 (2014) 605-613.
Yu-Jeng Lin and Gary T. Rochelle "Optimization of Advanced Flash Stripper for CO2 Capture using Piperazine", Energy Procedia 63 (2014) 1504-1513.
Yu-Jeng Lin, Tarun Madan, and Gary T. Rochelle, "Regeneration with Rich Bypass of Aqueous Piperazine and Monoethanolamine for CO2 Capture", Ind. Eng. Chem. Res. 2014, 53, 4067-4074.
A. Makaruk et al. "Membrane biogas upgrading processes for the production of natural gas substitute", Separation and Purification Technology 74 (2010) pp. 83-92.
Eros Rosalbino Minard et al., "Membrane applications for biogas production and purification processes: an overview on a smart alternative for process intensification", RSC Adv.,2015,5,14156.
S. Mirzaei at all, "A review of different solvents, mass transfer, and hydrodynamics for postcombustion CO2 capture", Review Chemical Engineering, 2015, DOI 10.1515/revce-2014-0045.
Mashallah Rezakazemi et al., "Hybrid systems: Combining membrane and absorption technologies leads to more efficient acid gases (CO2 and H2S) removal from natural gas", Journal of CO2 Utilization 18 (2017) 362-369.
G. Rochelle et al., "Aqueous piperazine as the new standard for CO2 capture technology", Chemical Engineering Journal 171 (2011) 725-733.
Fabiana Belen Torres et al., "Comparative analysis of absorption, membrane, and hybrid technologies for CO2 recovery", Journal of Natural Gas Science and Engineering 94 (2021) 104082.
David H. Van Wagener and Gary T. Rochelle, "Stripper configurations for CO2 capture by aqueous monoethanolamine". Chemical engineering research and design 89 (2011) 1639-1646.

METHOD OF GENERATING RENEWABLE NATURAL GAS

FIELD OF THE INVENTION

This invention relates to a method of generating pipeline-specification natural gas from raw biogas.

BACKGROUND OF THE INVENTION

Biogas generation and utilization is an emerging alternative energy technology. Biogas is obtained by a complex degradation process of organic matter that is performed by a set of bacteria under anaerobic conditions. Biogas is produced from a variety of organic materials in plants ranging from sewage treatment plants to organic waste utilization in landfill sites, to farm biogas production that utilizes ecologically pure crops and manure. The resulting gas consists primarily of methane and carbon dioxide together with smaller amounts of other gases and vapors, such as hydrogen sulfide, ammonia, volatile organic compounds (VOCs), and additionally siloxanes for landfill gas. As shown by a considerable number of biogas plants around the world, biogas production and utilization can result in additional available energy with reduced emission of methane and carbon dioxide to the atmosphere and the production of valuable fertilizer. Several biogas utilization methods can be applied. Presently the most popular approach is the production of Combined Heat and Power (CHP) by means of internal combustion engines. The CHP process can be deployed if heat consumers are in the vicinity of the plant. However, this requirement cannot be met in most cases. As a result, the excess heat energy is frequently vented into the atmosphere lowering the overall energy production efficiency and requiring additional electrical power for heat removal. The biogas upgrading to the pipeline natural gas quality avoids this shortcoming and generates renewable natural gas (RNG). The upgraded biogas is in the form of a natural gas substitute and can be injected into existent natural gas grids or used as a vehicle fuel using the natural gas infrastructure. The upgraded biogas can be distributed at a low cost and utilized with a higher efficiency by customers. However, to generate renewable natural gas the raw biogas must be upgraded to a pipeline specification by removing multiple impurities, where the key impurity and the largest volumetric component is carbon dioxide.

Methods heretofore known for the purification of biogas, in particular, carbon dioxide gas removal, may be divided roughly into the following classifications:

(a) Methods involving absorption separation unit operations, wherein water and, in particular, amine absorbent-based water solutions or physical solvents are utilized as an absorption media. In alkanol amine solutions the amine forms weak bonds with the acid gases at relatively low processing temperatures and (usually) elevated pressure. The rich amine solvent is regenerated by decreasing its pressure and increasing its temperature in a stripper, wherein the acid gas components are removed. Absorption using a physical solvent is applied at relatively low temperatures and relatively high pressures, wherein the solubility of the acid gas components is greater than that of light hydrocarbons. The physical solvent is generally regenerated by pressure reduction causing the dissolved gases to flash from the solvent.

(b) Methods involving membrane separation unit operations, wherein the carbon dioxide is removed by preferential permeation through a polymeric membrane.

(c) Methods involving adsorption unit separation operations, wherein the carbon dioxide is removed by a thermal or pressure swing adsorption process. The most common adsorbent is activated carbon but other adsorbents include zeolites, such as zeolite 5A, molecular sieve carbons, silica gel, activated alumina, or other adsorbents selective for carbon dioxide and gaseous hydrocarbons other than methane.

Membrane units remove carbon dioxide by selective permeation of $CO_2$ from high pressure to low pressure across a polymeric membrane. Membrane systems have numerous attractive features, such as intrinsic simplicity, the lack of cyclic valve switching, and the ability to generate dry biomethane at elevated pressure. Polymeric membranes can lose treating capacity over time due to exposure to contaminants, such as heavy hydrocarbons, and adsorption processes are commonly used as a pretreatment for the removal of water, heavy hydrocarbons, and other contaminants. The intrinsic simplicity of membrane gas separation processes made them attractive for biogas processing to produce renewable natural gas. However, the efficient removal of carbon dioxide from industrial process streams with a high product recovery by membrane processes requires staging. The membrane staging configuration must be optimized toward the specific application. Optimization of membrane units for removing carbon dioxide from natural gas is reviewed by Anjan K. Datta et al. in Journal of Membrane Science 283 (2006) 291-300. Membrane processes for biogas upgrading have been reviewed by A. Makaruk et al. in Separation and Purification Technology 74 (2010) pp. 83-92. A multistage membrane process for generating high-purity biomethane combined with high recovery from raw biogas is disclosed in U.S. Pat. No. 8,999,038. However, there is a disadvantage connected with a high flow of recycled permeated gas that leads to increases in compressor capacity and power consumption. To generate pipeline specification natural gas by a state-of-the-art multi-stage membrane system with high methane recovery, an increase of more than 50% in compressor capacity is required for the feed raw biogas compression.

Purification of biogas by adsorption processes has been used extensively. The bulk carbon dioxide removal is typically carried out by pressure swing adsorption (PSA) utilizing activated carbon. Combining the temperature swing adsorption (TSA) process with a PSA process provides for improved process economics. U.S. Pat. No. 4,770,676 describes a process combining a temperature swing adsorption (TSA) process with a PSA process for the recovery of methane from landfill gas. The TSA process removes water and minor impurities from the gas, which then goes to the PSA system, which is similar to U.S. Pat. No. 4,077,779, except that the external rinse step has been eliminated. $CO_2$ from the PSA section is heated and used to regenerate the TSA section. U.S. Pat. No. 4,857,083 claims an improvement over U.S. Pat. No. 4,077,779 by eliminating the external rinse step and using an internal rinse of secondary product gas ($CO_2$) during blow-down, and adding a vacuum for regeneration.

In addition to acid gas absorption, solid adsorbents, e.g., molecular sieves, can be employed for the further removal of carbon dioxide in conjunction with the absorption process. Liquid adsorption systems inherently have upper limits on carbon dioxide product concentration that can be below the permissible carbon dioxide concentration. Thus, adsorption is often employed when it is necessary to substantially remove carbon dioxide to levels of about 50 to 200 ppmv carbon dioxide, such as is typically required in liquefaction. In some instances, it can be desirable to eliminate the carbon dioxide absorption unit and perform the carbon dioxide removal by molecular sieve adsorption alone, e.g., for purification where bulk carbon dioxide removal is not required (i.e., natural gas feeds low in acid gas components).

TSA and PSA biogas upgrading adsorption units are comparable to membrane biogas upgrading units in electrical energy consumption, but they have the disadvantage of frequent cyclic valve switches and, therefore, are potentially less reliable due to valve failure.

As noted above, it is well-known to remove acid gases, such as hydrogen sulfide and carbon dioxide, from process streams including biogas using an amine system, wherein the acid gases are scrubbed from the feed with an aqueous amine solvent, with the solvent subsequently stripped of the carbon dioxide or other acid gases in the regeneration step, including via the use of steam. The use of an amine absorption process to treat biogas is disclosed in the U.S. Pat. No. 6,929,680. These systems are widely used in industry, with hundreds of units in operation worldwide treating natural gas or biogas. These systems are well accepted by the industry, although they are not very easy to operate. Keeping the amine solvents clean, preventing amine degradation by oxygen and other contaminants as well as solvent foaming that results in the carryover of the solvent into the product gas stream can be an issue. A major disadvantage of such systems in biogas and natural gas applications is high thermal energy consumption for the solvent regeneration step, coupled with strict limitations to the upper temperature of the heat transfer medium to prevent thermal degradation of amines.

Aqueous solutions of alkanolamines are the most commonly used chemical absorbents for the removal of acidic gases ($CO_2$ and $H_2S$) from biogas, natural gas, and a variety of refinery and synthesis gas streams. Among them, aqueous monoethanolamine (MEA) as a primary amine has been used extensively for this purpose, especially for the removal of $CO_2$. It has several advantages over other commercial alkanolamines, such as high reactivity, low solvent cost, low molecular weight, and, thus, high absorbing capacity on a mass basis and reasonable thermal stability and thermal degradation rate. The disadvantages of MEA include high enthalpy of reaction with $CO_2$, leading to higher regeneration energy consumption, and the formation of a stable carbamate. In the presence of oxygen-containing feed gas, MEA forms degradation products; vaporization losses can be high due to high vapor pressure and the solvent is more corrosive in nature than many other alkanolamines and, thus, corrosion inhibitors are needed when used in higher concentrations. Piperazine (PZ) and piperazine-activated alkanolamines are new solvents that provide a higher reaction rate, capacity, and thermal stability than the conventional solvent, monoethanolamine. The superior energy performance of piperazine as compared to MEA has been demonstrated by G. Rochelle et al., Chemical Engineering Journal 171 (2011) 725-733. The use of MDEA+PZ solvent mixture can increase the $CO_2$ absorption rate significantly and $CO_2$ heat absorption by MDEA+PZ is lower than that of the primary amines, such as MEA. The MDEA+PZ solvent mixture is considered to have a superior combination of properties as compared to most amine-based systems. (S. Mirzaei at all, Rev Chem Eng, 2015).

A particular disadvantage of the amine solvent treatment for the removal of acid gases is that the solvents are used as a mixture with water, and thus, the product gas generated by the amine treatment plant is saturated in water vapor. This requires downstream dehydration, which most commonly is carried out using glycol solvents that can be followed by an adsorption system, such as a molecular sieve system. Adsorption units using silica gels are used in a wide variety of dehydration applications as well. However, the most common process for dehydration in the natural gas industry is the glycol dehydration process, in which a stream of glycol, for example, triethylene glycol, is contacted against the incoming wet methane gas stream. The glycol solvent extracts water from the stream and a product with reduced water content is produced. The rich glycol stream is subsequently regenerated by pressure reduction and heating, after which it is recycled back as a lean stream to continue its water removal service. Both silica gel and glycol dehydration-based processes require thermal or electrical energy consumption and add operational and capital costs to the gas purification process.

It has been further proposed in U.S. Pat. No. 7,442,233, issued to Michael J. Mitariten, to use adsorption as a means of dehydrating sweetened natural gas generated by the amine absorption system, bypassing glycol dehydration. The integrated process of treating raw natural gas disclosed comprises a three-step process involving the adsorption of heavy hydrocarbons and water on an adsorbent bed selective for the same, a subsequent aqueous lean amine treatment for the absorptive removal of acid gases, such as carbon dioxide and hydrogen sulfide, and adsorptive removal of water. The use of a membrane separation step as a bulk $CO_2$ removal step prior to the amine absorption step is further disclosed.

It is further known to use absorption processes as impurity removal pretreatment steps in natural gas and biogas purification. The removal of heavy hydrocarbons by an absorption process was first disclosed by Mehra in U.S. Pat. No. 4,421,535. A biogas purification process that integrates a membrane-based acid gas removal system with an absorption pretreatment system is disclosed by Sandeep K. Karode in U.S. Patent Application Publication No. US 2004/0099138 A1. A high-purity stream of methane can be obtained from a raw gas, such as landfill gas, by a process that includes first removing moisture, then feeding the dried crude gas mixture to a gas-liquid contact absorber to strip heavy hydrocarbon compounds. Methane-enriched gas from the absorber is separated in a membrane separation unit, which provides a purified product stream of methane and a permeate enriched in carbon dioxide that is liquified and recycled to the absorber.

To optimize acid gas removal process economics, a combination of several gas separation unit operations has been deployed by the industry, including a combination of membrane and absorption processes. S.R. Dunne et al., in U.S. Pat. No. 8,454,727, disclose a hybrid process for carbon dioxide removal, wherein a membrane system is used for bulk $CO_2$ gas removal followed by an adsorption process. It is known to use an integrated membrane/absorption process for acid gas conditioning, wherein membrane units are used as bulk CO2 removal devices followed by amine processing for final $CO_2$ removal to target product specification. In this configuration, the first stage of raw gas treatment consists of a pretreatment system to adjust the gas dew point to remove heavy hydrocarbons, contaminants, and water, followed by a membrane unit for bulk $CO_2$ removal, followed by an amine system for the final acid gas removal. The amine unit in this application re-introduces water vapor back into the product natural gas and, thus, down-stream dehydration is subsequently required. The process economics of standalone amine systems and membrane systems as compared to a hybrid membrane/amine system for natural gas treatment is described by W. Echt, "Hybrid technologies: combining technologies leads to more efficient gas conditioning", 2002 Laurance Reid Gas Conditioning Conference. The economics of stand-alone amine absorption, stand-alone membrane process, and a hybrid amine/absorption process for $CO_2$ removal from natural gas are discussed by R. Baker et al. in Ind. Eng. Chem. Res. 2008, 47, 2109-2121.

A hybrid membrane-absorption process for $CO_2$ capture from flue gases with carbon dioxide to be sequestered is described by B. Freeman et al. in Energy Procedia v. 63 (2014) pp. 605-613. In the series absorber and membrane configuration, the absorber is used to remove about half of the $CO_2$ from the flue gas, followed by additional separation by the membrane system in a form of a contactor. The contactor is assisted by permeate side sweep to achieve 90% total removal of $CO_2$ by the hybrid capture system. In this arrangement, the absorber operates at a higher lean-loading state and can be roughly half the size as compared to a conventional absorption process. This is important since the flue-gas system is available at near-atmospheric pressure. Another key feature is that the amine solution regeneration process is conducted at a high temperature (150° C.) and pressure (5-10 bar) that is favorable for down-line $CO_2$ sequestration. This hybrid configuration described by Freeman et al. is optimized for carbon capture for purpose of sequestration and is not applicable to the treatment of biogas or natural gas to produce a pressurized high-purity methane product.

However, there is still a need for an improved energy-efficient biogas treatment process that overcomes the limitations of the prior art. State-of-the-art membrane systems are characterized by high electrical power consumption related to recycled gas recompression. State-of-the-art amine-based absorption processes in biogas purification are characterized by high thermal energy consumption required to regenerate the absorbent solution.

SUMMARY OF THE INVENTION

The present invention provides an integrated biogas to biomethane (Renewable Natural Gas (RNG)) upgrading process, wherein the bulk amount of carbon dioxide is removed by an absorption process step followed by a membrane purification step that completes the removal of carbon dioxide while simultaneously dehydrating the product biomethane to the target product specification. The individual separation unit operations and their combination are optimized to reduce the overall energy consumption of upgrading biogas to RNG pipeline specification with respect to the efficiency and reliability of the process.

One embodiment of the method for the purification of a raw biogas feed stream containing carbon dioxide and methane comprises the steps of:
  (i) compressing a raw biogas gas feed stream in a compressor to pressure from 6 to 25 barg followed by aftercooling and condensate separation, thereby forming a first effluent stream;
  (ii) passing said first effluent stream into a gas absorption unit, wherein a lean absorbent removes a portion of carbon dioxide from said first effluent stream, thereby forming a second effluent stream having a lower carbon dioxide content than said first effluent stream and a rich in carbon dioxide absorbent stream;
  (iii) passing said second effluent stream to a membrane separation unit containing a polymeric membrane selective for removal of carbon dioxide and water wherein, said membrane separation unit generates a retentate methane product stream and a permeate reject stream enriched in carbon dioxide and water vapor;
  (iv) passing said rich in carbon dioxide absorbent liquid to an absorbent regeneration unit to generate a lean absorbent liquid depleted of carbon dioxide by way of pressure reduction;
  (v) passing lean absorption liquid to said acid gas absorption unit;
  (vi) passing said permeate reject stream to a front end of the compressor, wherein the permeate stream is mixed with said raw biogas feed stream; and
  (vii) collecting said retentate methane gas product stream.

The absorbent liquid rich in carbon dioxide is regenerated by way of pressure reduction, i.e., by reducing the pressure of the rich absorption liquid, which regeneration can take place in one or more flash-regeneration units. The level of pressure reduction must be sufficient to enable the removal of carbon dioxide from the first effluent stream in the absorption unit to the target level in the second effluent stream. The level of carbon dioxide in this second processed effluent stream must be sufficiently low to enable the removal of carbon dioxide to the pipeline specification by the membrane unit downstream. The pressure may be reduced to an atmospheric or a sub-atmospheric level. In some embodiments, the flash regeneration can be further assisted by the application of additional secondary heat from a compressor cooling system or another heat source. Flash regeneration assisted by the application of additional secondary heat is defined as regeneration by way of pressure reduction.

It is further with the scope of the invention to regenerate the rich absorbent liquid in two or more flash-regeneration units, wherein each regeneration unit may be maintained at a different pressure reduction level. The regeneration efficiency in one of the regeneration units may be further aided by way of additional secondary heat application to affect a deeper regeneration level. The waste compressor heat may be used as one mechanism of heat application.

The method of the instant invention is characterized by low energy consumption in the absorbent regeneration process step. This is accomplished by utilizing absorbents with carbon dioxide sorption characteristics that exhibit a strong pressure dependency. Thus, the regeneration step can be carried out without heat energy input or with low supplemental energy input utilizing a secondary heat source, such as available from the feed compressor cooling system. The combination of the absorption step that does not require external energy input for the absorbent regeneration followed by the membrane step that is characterized by a low permeate recycle volume allows for a reduction in the overall system energy consumption.

It is within the scope of the invention to process effluent from the absorption unit in one or more membrane separation units that can be arranged in series or in parallel. The individual membrane separation units may contain membranes with the same or different separation characteristics. It is further within the scope of the invention to operate individual membrane separation units at different pressures and/or temperatures. The membrane selection and process conditions are optimized toward the removal of carbon dioxide, water vapor, oxygen, or other impurities in the feed stream. The membrane separation unit separates carbon dioxide, water vapor, and other gaseous impurities by selective permeation through a gas-selective membrane, wherein impurities are removed into the low-pressure permeate stream and the methane product is recovered as a high-pressure retentate/non-permeate stream.

The above and other features of the invention, including various novel details of construction and combinations of parts, and other advantages, will now be more particularly described with reference to the accompanying figures and pointed out in the claims. It will be understood that the particular method and articles embodying the invention are shown by way of illustration and not as a limitation of the invention. The principles and features of this invention may be employed in various and numerous embodiments without departing from the scope of the invention.

DETAILED DESCRIPTION OF THE PREFERRED EMBODIMENTS

Figure 1:
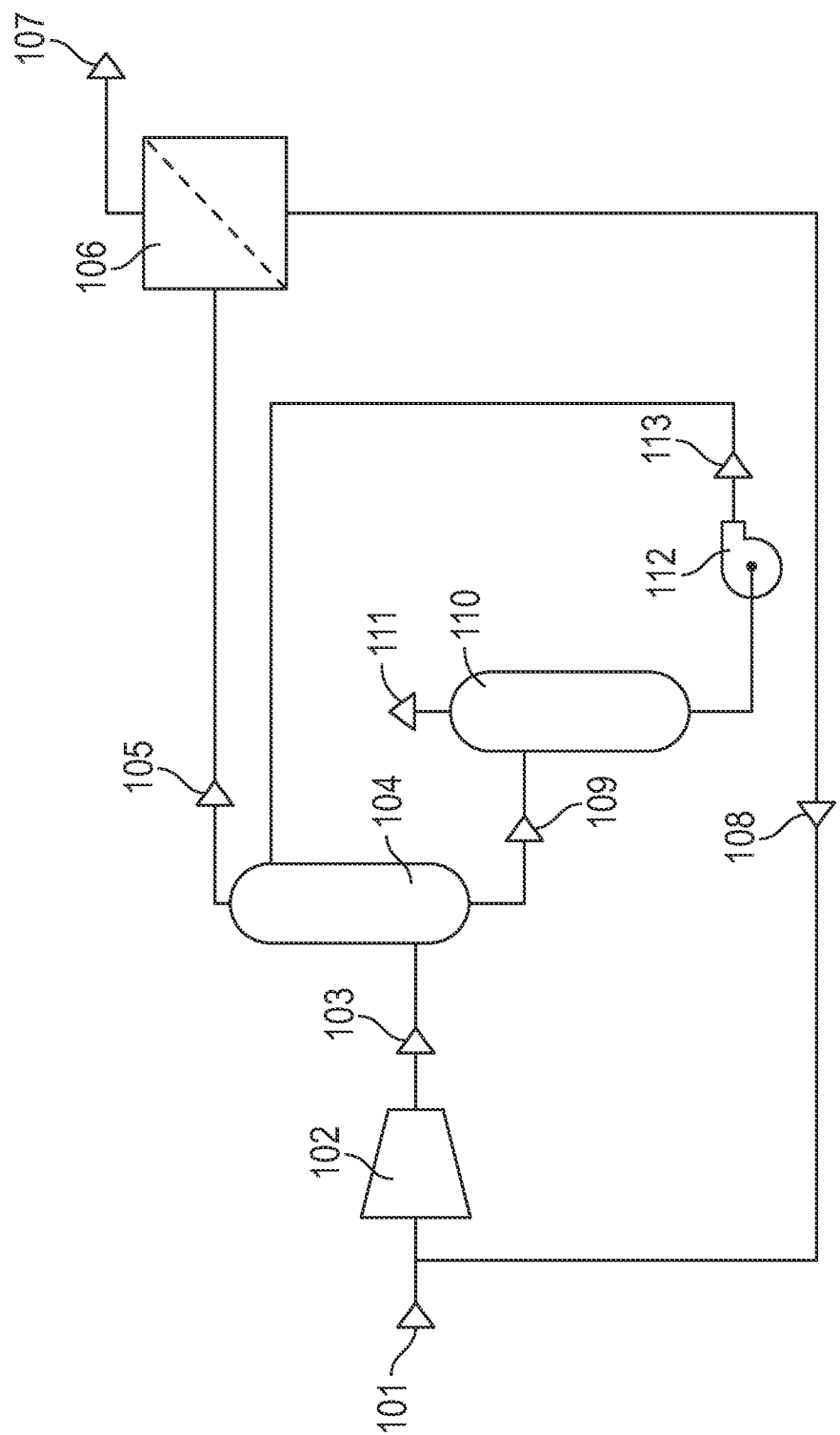
FIG. 1 is a schematic drawing of a basic embodiment of the invention including a compressor, a carbon dioxide absorption unit, an absorbent regeneration unit, and a membrane separation unit.

The method of the present invention provides an improved process of producing Renewable Natural Gas (RNG) from biogas. The carbon dioxide is removed from biogas to generate the pipeline specification RNG by a combination of absorption and membrane processes. The absorption process provides for the initial bulk carbon dioxide removal. The membrane process provides for the simultaneous removal of carbon dioxide and water vapors to pipeline specification. The method is characterized by a reduced separation energy consumption as compared to stand-alone membrane and absorption unit separations for biogas upgrading.

The raw biogas predominantly consists of methane and carbon dioxide, wherein the $CO_2$ concentration varies from 15 to 60%, more commonly from 30 to 55%. The carbon dioxide must be removed and the caloric value of the product gas increased prior to injecting the RNG into the distribution grid. The carbon dioxide concentration must be removed to meet the local pipeline specification, which can vary from 5 to 2% mol. However, if the biogas gas contains a significant concentration of inert impurities, such as nitrogen, the product gas carbon dioxide concentration may need to be removed further to meet the pipeline's total inert gas concentration limit. The excess nitrogen can be removed in a post-purification step via a membrane or Pressure Swing Adsorption (PSA) system.

The RNG product must be generated at pipeline pressure and, thus, biogas is preferably compressed to a desirable pipeline pressure prior to undergoing purification steps to remove carbon dioxide. The biogas is most commonly compressed to pressures between 6 to 25 barg prior to carbon dioxide removal. The efficiency of both absorption and membrane processes increases with an increase in the feed gas pressure. However, the overall system energy consumption can increase by compressing the feed raw biogas to a pressure above 25 barg. If the biomethane must be injected into a trunk pipeline with a higher pipeline pressure, a booster compressor can be deployed. Operating the absorption system at a pressure below 6 barg makes the absorption process by way of pressure reduction inefficient. Thus, the 6 to 25 barg pressure range is considered preferable for the method of the invention.

The raw biogas can further contain a number of impurities in variable concentrations that must be removed prior to RNG injection into the grid. These impurities may include $H_2S$, siloxanes, volatile organic hydrocarbons, ammonia, and water vapor among others. These impurities are removed by methods well known in the art and can include adsorption by activated carbon, water wash, and/or a combination of treatment steps. These impurities are removed prior to biogas compression or, alternatively, following the biogas compression. It is also within the scope of the invention to remove some impurities prior to compression while removing the rest of the impurities following compression. When the impurities are removed prior to compression, the pressure of the raw biogas may be increased to enable efficient processing. The pressure may be increased by way of a gas blower or a separate compressor, but typically will not exceed 0.5 barg. In one example, the ammonia present in the biogas is removed by way of a water wash prior to compression, while the remaining impurities are removed by adsorption following biogas compression.

The principal method of the invention is described with reference to FIG. 1. The raw biogas feed stream is designated as (101). The raw biogas feed stream (101) is combined with the recycle stream (108) and is fed into the intake of the compressor (102). The combined gas stream is compressed to the target pressure determined by the pressure in the receiving pipeline followed by aftercooling and condensate separation (not shown). The compressed gas forms the first effluent stream (103). Compressed, cooled, and condensate separated, the raw biogas forming the first effluent stream (103) is fed into the lower part of the absorber (104), wherein it is contacted with the lean absorbent liquid. The first effluent stream is passed countercurrent to the lean absorbent liquid and forms the second effluent stream (105) depleted of carbon dioxide that is removed at the top of the column. To improve the efficiency of heat and mass transfer between the gas and the liquid, tray columns or columns with regular or irregular structured packing can be used in the absorber vessel. The absorbent liquid temperature increases as a result of carbon dioxide absorption. To increase the absorbent's loading, the absorbent liquid can be cooled in the intermediate sections of the absorption vessel. The carbon dioxide concentration in the second effluent stream can be lowered by a factor of 2 to 15 as compared to the carbon dioxide concentration in the raw biogas feed stream.

The regeneration of the rich absorbent stream (109) is carried out in a flash regeneration unit (110) by way of pressure reduction, wherein a fraction of the absorbed $CO_2$ is released leading to the liquid's temperature decrease. The absorption liquid characteristics, the liquid's loading, and temperature affect $CO_2$ desorption efficiency. The absorption liquid characteristics and process conditions are selected to remove at least 10 mass percent of carbon dioxide from the rich absorption liquid into the desorbed acid gas stream (111) by way of liquid pressure reduction to the atmospheric pressure. Absorbents that exhibit high $CO_2$ loading and show a strong dependence of $CO_2$ loading on pressure are preferred. It is known in the art to utilize aqueous amine solutions and physical absorbents as the absorption liquid media with high loading and lading pressure dependency. The lean absorbent liquid (113) is transported via pump (112) to the top of the absorption unit (104).

The second effluent stream (105) is further treated in a membrane separation unit (106) that contains a polymeric membrane selective toward the removal of carbon dioxide, water vapor, and oxygen from methane. The carbon dioxide and water vapor still remaining in the second effluent stream are removed by permeation to generate the methane product stream (107) that meets the pipeline specification. The permeate stream (108) containing some residual methane is recycled to the front intake of the compressor (102).

The membrane separation unit is comprised of one or more membrane separation modules arranged in series or in parallel. The modules are equipped with semipermeable membranes exhibiting $CO_2/CH_4$ gas separation factor above 25, preferably above 35, and most preferably above 45, as measured at room temperature. The membranes further exhibit a high-water vapor/methane selectivity of 200 or more. In some embodiments, it is desirable to remove other impurities, such as oxygen, by the membrane unit. For efficient oxygen removal, membrane modules equipped with membranes exhibiting an oxygen/methane separation factor of above 5, preferably above 6, as measured at room temperature should be utilized. The gas separation efficiency is affected by the pressure ratio, i.e., the feed gas to the permeate gas pressure. To maintain the high pressure ratio, the permeate gas is collected at low pressure, not to exceed the compressor intake pressure.

The membranes preferably operate in a counter-current mode to increase separation thermodynamic efficiency and reduce the volume of the recycled permeate gas. It is further in the scope of the invention to deploy membranes with different separation characteristics in sequential stages. It is known to utilize the permeate gas of the subsequent membrane stage as a purge gas on the permeate side of the preceding membrane stage to improve separation efficiency. The operation temperature in each membrane stage may be the same or different to optimize the overall separation efficiency. The gas may be preheated or cooled between stages to control the temperature. In some embodiments, it may be desirable to increase the separation efficiency of the membrane unit by the use of the permeate side sweep with a fraction of the retentate gas. Each module has a polymeric membrane with a defined high-pressure side and low-pressure side, each module has an inlet port connected to the high-pressure side, a retentate outlet port, and a permeate outlet port, therein the retentate outlet port providing an outlet for gas on the high-pressure side, and the permeate outlet port providing an outlet for gas on the low-pressure side. The feed gas is conveyed into the inlet port, the retentate gas is conveyed from the retentate outlet port, and the permeate gas is conveyed from the permeate port wherein a portion of the retentate gas from the retentate outlet is conveyed into the low-pressure permeate side while the remainder of the retentate gas from the retentate port is conveyed to a pipeline. The fraction of the retentate gas conveyed to the permeate side is controlled to affect retentate product purity.

In one example, the feed raw biogas (101) with an initial $CO_2$ content of 40.6% (mol.), balance methane, and a volumetric flow of 1000 m³/h at normal atmospheric pressure conditions is treated by the method of the instant invention to remove carbon dioxide and generate pipeline quality methane. The feed biogas stream is combined with the recycle membrane permeate stream (108) to generate a feed flow of 1250 m³/h to the intake of the compressor. The gas is compressed in compressor (102) to 19 barg, the compressed gas is treated in an aftercooler to reduce the temperature to 40° C., and condensate is removed to form the first effluent stream (103). The compression step consumed about 280 kW of electrical power.

The first effluent stream (103) was treated in the absorber unit (104) to remove the bulk amount of carbon dioxide and the second effluent stream (105) of a reduced $CO_2$ content was generated. The gas is flown counter-current to the absorption liquid (113) to maximize the mass transfer efficiency. The absorption liquid was comprised of 12.6% (mol) methyl diethanolamine, MDEA, and 2.1% (mol) piperazine (PZ) in water. The initial absorption liquid contained 10.1 mass % $CO_2$ and the liquid temperature was 45° C. Following $CO_2$ absorption, a rich absorbent liquid stream (109) is formed that contains 13.4 mass % of $CO_2$ and the rich absorption liquid is discharged from the absorption system at a temperature of 60° C. The second effluent stream (105) contains 10.4% mol $CO_2$. The second effluent gas stream was further treated in the membrane unit (106) to remove the remaining $CO_2$ and water vapor. The $CO_2$ retentate product gas concentration is reduced to 2.5% (mol.) with a water dew point of −10° C. The permeate stream (108) volume does not exceed 250 m³/h and is recycled to the intake of the compressor.

The rich absorbent liquid (109) is regenerated in a flash regeneration unit (110) by way of pressure reduction to atmospheric pressure. The rich absorption liquid is further heated utilizing supplemental heat generated by the compressor to compensate for evaporation cooling. The heat provided by the compressor raises the liquid's temperature by up to 5° C. The lean absorption liquid (113) is returned to the top of the absorption unit (104) and the carbon dioxide stream (111) is discharged to the atmosphere or recovered as a product. The absorption liquid is pumped by the recirculation pump (112) at a rate of 25 tons per hour with electrical energy consumption of 20 kW.

The instant invention provides an overall reduction in the purification process energy consumption as compared to the state-of-the-art standalone membrane process, which has a permeate recycle as high as 50% of the raw biogas. Additional embodiments of the instant invention provide a further reduction in separation energy consumption by improved utilization of the secondary compressor heat and deploying an optimized multi-stage flash-regeneration system.

Figure 2:
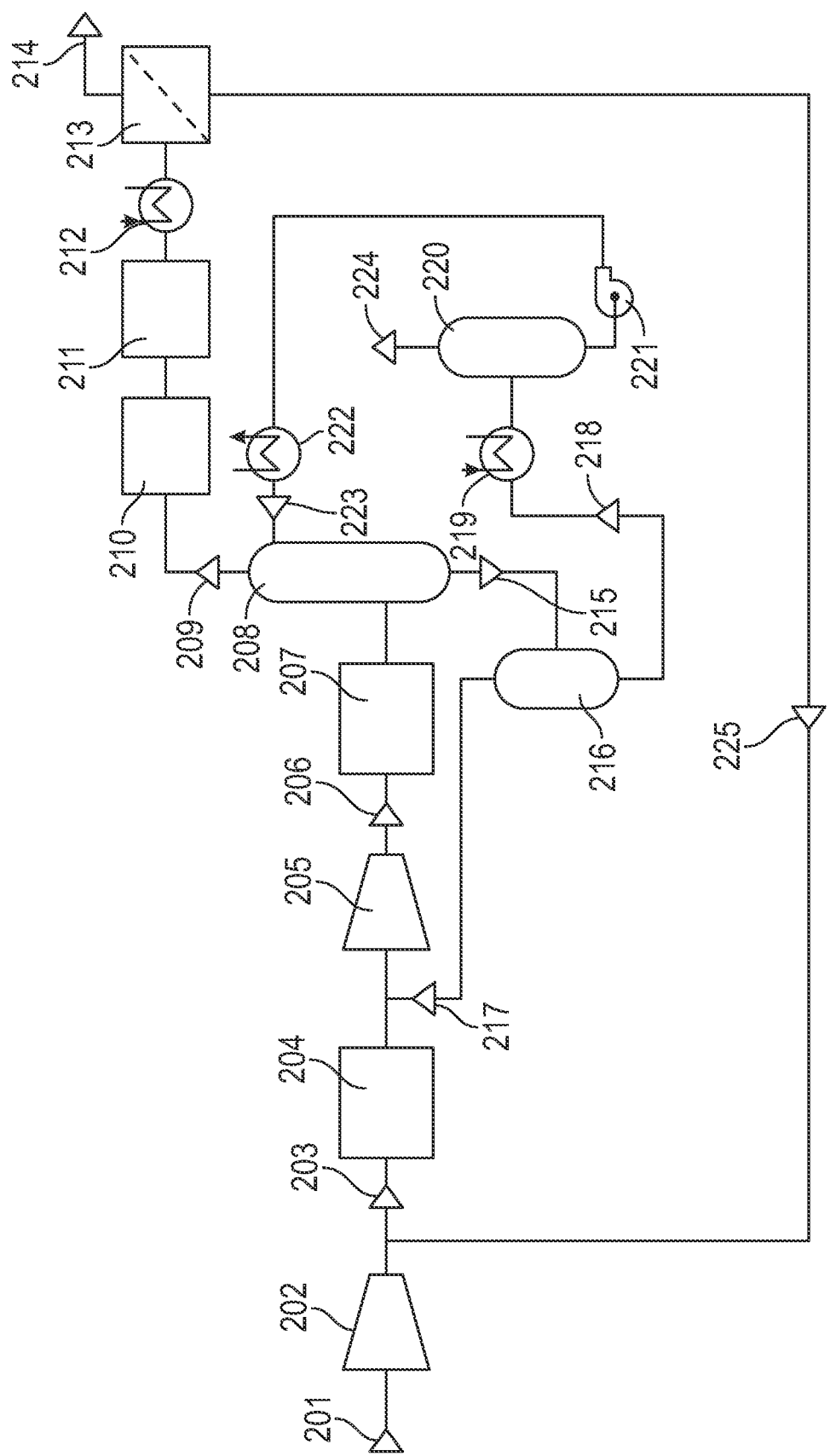
FIG. 2 is a schematic drawing depicting a preferred detailed embodiment of the invention that includes a compressor, a number of contaminant removal pretreatment units, a carbon dioxide absorption unit, a two-stage absorbent flash regeneration unit, and a membrane separation unit.

It is within the scope of this invention to increase separation energy efficiency by utilizing a multi-stage flash regeneration system. It is also within the scope of the invention to carry out feed gas biogas pretreatment, alternatively, prior to or following gas compression to the target processing pressure. These embodiments are further disclosed with reference to FIG. 2. The pressure of the raw biogas (201) is increased incrementally by a blower (202) up to 0.5 barg at which point it is combined with the membrane permeate recycle stream (225) and the combined gas stream (203) is directed into the first pretreatment system (204). Optionally, the membrane permeate gas recycle stream can be introduced prior to the blower (202) to reduce membrane permeate side pressure. The first pretreatment system can be a single-stage pretreatment or a combination of a number of pretreatment systems, such as a water wash system and an adsorption system, tailored to the removal of specific contaminants. Following the initial pretreatment, the gas is combined with the gas recycle stream from the first regeneration unit and the combined stream is compressed in the compressor (205) equipped with an aftercooler and separator to form the first effluent stream (206). The first effluent stream is compressed to the target optimal processing pressure, preferably aligned with the pipeline pressure. In some embodiments, the first pretreatment system may be omitted and contaminants removed following compression.

This first effluent stream is processed in the second pretreatment system (207) to remove the remaining contaminants. The second pretreatment system can be a single-stage pretreatment or a combination of a number of pretreatment systems, such as adsorption systems tailored to the removal of specific contaminants. The pretreatment can further include an oxygen removal unit that overwise can affect the chemical stability of amine-based absorption systems. The thus pretreated gas stream is directed to the absorption system (208) optimized toward the removal of carbon dioxide. The first effluent stream is passed countercurrent to the lean absorbent liquid and forms the second effluent stream (209) depleted of carbon dioxide that is removed at the top of the column. To improve the efficiency of heat and mass transfer between the gas and the liquid, tray columns or columns with regular or irregular structured packing can be used in the absorber vessel. The absorbent liquid temperature increases as a result of carbon dioxide absorption. To increase the absorbent's loading the absorbent liquid can be cooled in the intermediate sections of the absorption vessel. The carbon dioxide concentration in the second effluent stream can be lowered by a factor of 2 to 15 as compared to the carbon dioxide concentration in the raw biogas feed stream.

The second effluent stream is treated in a water removal unit (210) to reduce the water vapor dew point and prevent water condensation downstream. The water removal unit may include a chiller, a refrigeration unit, or other mechanism of water dew point suppression. The second effluent stream is optionally further treated in a third adsorption unit (211) to remove contaminants, such as absorption liquid vapors, that can affect membrane performance downstream. The second effluent stream is preheated in a heat exchanger (212) to the desired temperature optimal for membrane separation efficiency and the conditioned second effluent stream is directed into the membrane separation unit (213).

The second effluent stream (209) is further treated in the membrane separation unit (213) that contains a polymeric membrane selective toward the removal of carbon dioxide, water vapor, and oxygen from methane. The carbon dioxide and water vapor still remaining in the second effluent stream are removed by permeation to generate the methane product stream (214) that meets the pipeline specification. The permeate stream (225) containing some residual methane is recycled to the front intake of the compressor (205).

The rich absorption liquid (215) is removed from the bottom of the absorption unit (208) and regenerated in a multi-stage flash regeneration system that enables a deeper level of absorbent regeneration. The rich absorption liquid (215) is directed into the first flash regeneration vessel (216), wherein initial regeneration at above atmospheric pressure takes place. The relatively small flash gas stream (217), containing carbon dioxide and methane, is recycled to the front end of the compressor to increase methane recovery. The rich absorbent liquid (218) that underwent a partial regeneration is removed from the bottom of the first flash regeneration vessel and directed to the second flash regeneration vessel (220). The stream (218) is heated by the application of secondary heat in a heat exchanger (219) prior to being directed into a flash vessel (220), wherein the pressure of the absorption liquid is reduced to atmospheric pressure and a lean absorption liquid is removed from the bottom of the vessel. The pump (221) directs the lean absorption liquid via a heat exchanger (222), wherein the lean absorption liquid is cooled and its temperature is reduced. Thus formed, the lean absorption liquid (223) is optionally filtered to remove impurities and degradation products and injected into the top section of the absorption vessel (208). The carbon dioxide stream (224) generated during flash regeneration in vessels (220) is vented to the atmosphere or processed as a separate product.

In some embodiments, it may be required to increase $CO_2$ loading or absorption rate during the absorption step, which in turn requires a deeper level of absorbent regeneration. To increase the difference in $CO_2$ loading between the lean and the rich absorbent streams, the secondary heat from a compressor cooling system or another heat source is supplied to the rich absorption liquid in the flash regeneration system and the lean absorbent is cooled before being recycled to the gas absorption unit.

Figure 3:
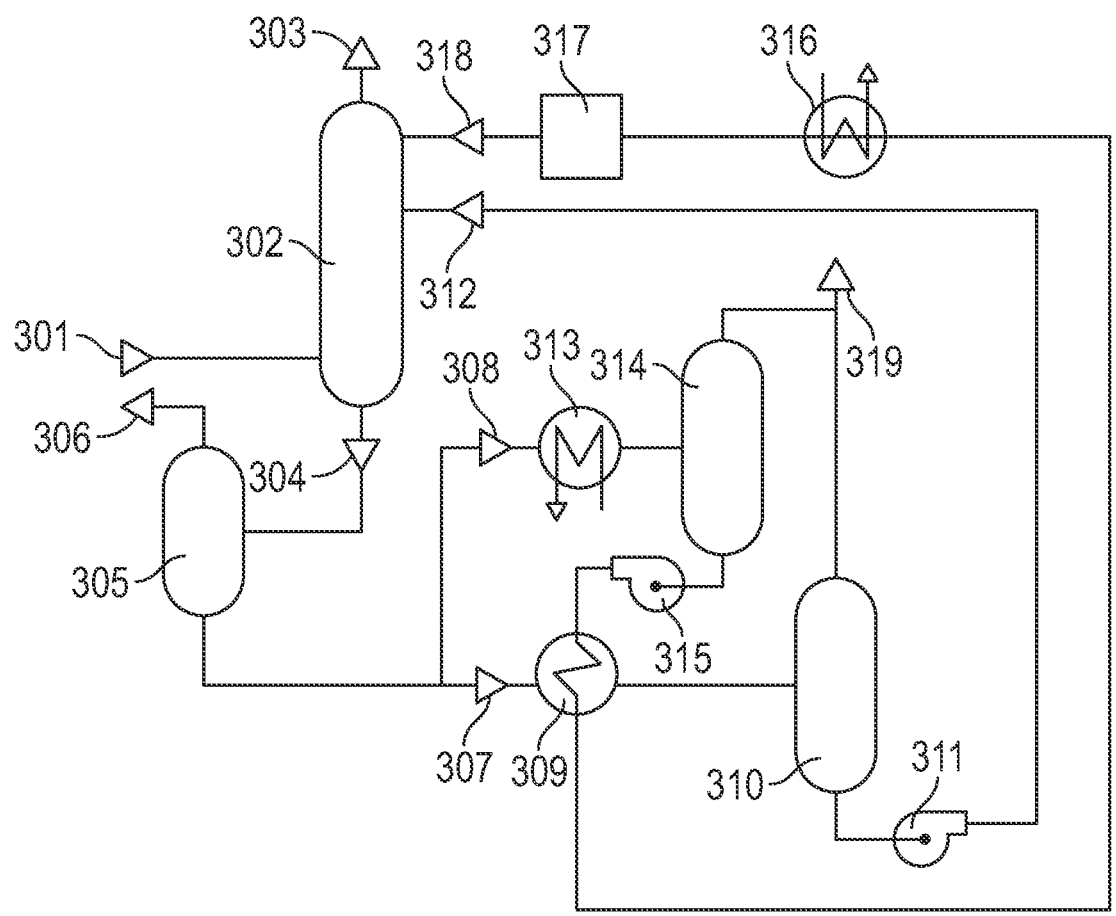
FIG. 3 is a schematic drawing of an absorption unit integrated with two-stream flash regeneration units that further include a secondary heat application. The regeneration system further includes an in-line adsorption unit to remove contaminants and chemical degradation products from the absorbent fluid.

A multi-stage flash regeneration system with a deeper level of absorbent regeneration is shown schematically in FIG. 3. The first effluent stream (301) containing carbon dioxide and methane is directed to the absorbent vessel (302), wherein the second effluent gas stream (303) depleted of carbon dioxide is generated. The second effluent stream undergoes additional treatment in a membrane system downstream (not shown). The rich absorbent liquid (304) is directed into the first flash regeneration vessel (305), wherein initial regeneration at above atmospheric pressure takes place. The relatively small flash gas stream (306), containing carbon dioxide and methane, is recycled to the front end of the compressor to increase methane recovery. The rich absorbent liquid that underwent a partial regeneration is removed from the bottom of the first flash regeneration vessel and split into two streams—a larger volume stream (307) and a smaller volume stream (308). The stream (308) is heated by the application of secondary heat in a heat exchanger (313) prior to being directed into a flash vessel (314), wherein the pressure of the absorption liquid is reduced to atmospheric pressure and a lean absorption liquid is removed from the bottom of the vessel. The pump (315) directs the lean absorption liquid via a heat exchanger (309), wherein the heat from the lean absorption liquid is transferred into the rich absorption liquid (307) to the heat exchanger (316), wherein the lean absorption liquid is cooled. Thus formed, the lean absorption liquid (318) is further filtered in the filter (317), where impurities and degradation products are removed and injected into the top section of the absorption vessel (302). The second rich absorption liquid (307) is heated via heat transfer from the lean absorption liquid (318) in the heat exchanger (309) and regenerated in a flash regeneration vessel (310) at atmospheric pressure. The lean absorption liquid is removed from the bottom of the vessel. This second larger-in-volume lean absorption liquid (312) is directed via pump (311) into the middle section of the absorption vessel (302). The second lean absorption liquid can be optionally cooled as well prior to being injected into the absorption vessel. The carbon dioxide streams generated during flash regeneration in vessels (310) and (314) are combined in a stream (319) and the stream is vented to the atmosphere or processed as a separate product.

Some biogas streams may contain oxygen in addition to other contaminants. Oxygen removal may be required to prevent absorbent degradation and/or to meet the pipeline specification. Oxygen removal can be further carried out utilizing a thermal oxidizer unit. Catalytic combustion of oxygen utilizing the thermal oxidizer unit can be carried out upstream of the carbon dioxide absorption unit or downstream of the absorption or membrane unit.

The present invention is described with reference to Figures and a number of embodiments, which should not be construed as limiting the present invention.

The invention claimed is:

1. A process for the purification of a raw biogas feed stream containing carbon dioxide and methane, said process comprising the steps of:
   (i) compressing a raw biogas feed stream in a compressor to a pressure from 6 to 25 barg followed by aftercooling and condensate separation, thereby forming a first effluent stream;
   (ii) passing said first effluent stream into a gas absorption unit, wherein a lean absorbent removes a portion of carbon dioxide from said first effluent stream, thereby forming a second effluent stream having a lower carbon dioxide content than said first effluent stream and a rich in carbon dioxide absorbent stream;
   (iii) passing said second effluent stream to a membrane separation unit containing a polymeric membrane selective for removal of carbon dioxide and water, wherein said membrane separation unit generates a retentate methane gas product stream and a permeate reject stream enriched in carbon dioxide and water vapor;
   (iv) passing said rich in carbon dioxide absorbent stream to an absorbent regeneration unit to generate a lean absorbent stream depleted of carbon dioxide by way of pressure reduction;
   (v) passing said lean absorbent stream to said gas absorption unit;
   (vi) passing said permeate reject stream to a front end of the compressor, wherein the permeate reject stream is mixed with said raw biogas feed stream; and
   (vii) collecting said retentate methane gas product stream.

2. The process of claim 1 wherein the raw biogas feed gas stream is initially compressed to a pressure not to exceed 0.5 barg, by a gas blower or a second compressor and the feed stream is treated in a biogas pretreatment unit to remove at least one of ammonia, $H_2S$, heavy hydrocarbons, siloxanes and water prior to the raw biogas feed stream being compressed in step (i).

3. The process of claim 1 wherein the raw biogas feed stream is treated to remove ammonia, $H_2S$, heavy hydrocarbons, siloxanes and water after the raw biogas feed stream is compressed in step (i) and prior to step (ii).

4. The process of claim 1 wherein the raw biogas feed stream, the first effluent stream, or the second effluent stream is treated to remove oxygen in an oxygen removal unit.

5. The process of claim 1 wherein the second effluent stream is passed through a water removal unit to reduce a water dew point prior to directing the second effluent stream into the membrane separation unit.

6. The process of claim 1 wherein said second effluent stream is passed through an adsorption unit adapted to remove contaminants that otherwise affect membrane performance prior to treatment by said membrane separation unit.

7. The process of claim 1 wherein the second effluent stream is passed through a heater prior to being directed to the membrane separation unit.

8. The process of claim 2 wherein said polymeric membrane is selective for oxygen removal, the retentate stream is depleted of oxygen and the permeate reject stream is enriched in oxygen, and the reject permeate stream is recycled to the raw biogas feed stream to increase beneficial oxygen content in the biogas pretreatment unit.

9. The method of claim 1 wherein the rich in carbon dioxide absorption stream is regenerated in a flash regeneration system without external heat energy supply.

10. The method of claim 1 wherein the rich in carbon dioxide absorbent stream is regenerated in a two-stage flash regeneration system where a first flash regeneration stage is carried out at above atmospheric pressure, between 3 to 10 barg, and a second flash regeneration stage is carried out at substantially atmospheric pressure or a sub-atmospheric pressure, wherein a first gas stream generated in the first flash regeneration stage containing methane and carbon dioxide is recycled to the front end of the compressor to increase methane recovery and wherein a second gas stream generated in the second flash regeneration stage is vented or recovered as a carbon dioxide product.

11. The method of claim 1 wherein the rich in carbon dioxide absorption stream is regenerated in a flash regeneration system with an application of additional secondary heat from a compressor cooling system or another heat source and wherein the lean absorption stream is cooled before being recycled to the gas absorption unit.

12. The method of claim 1 wherein the rich in carbon dioxide absorption stream is divided into a first stream and a second stream of a smaller and a larger volume, respectively, prior to regeneration and the first stream is heated by an available secondary heat source, flash regenerated and following aftercooling is injected in a top level of the gas absorption unit, and the second stream is recuperatively heated by heat exchange with the first stream, flash regenerated and injected into an intermediate level of the gas absorption unit.

13. The method of claim 1 wherein at least a fraction of the lean absorption stream is treated to remove contaminants and absorbent degradation products prior to the lean absorption stream being introduced into the gas absorption unit.

14. The method of claim 1 wherein a fraction of the retentate methane gas product stream generated by the membrane separation unit in step (iii) is directed to the permeate reject stream of the membrane unit and a remaining fraction of the retentate methane gas stream is collected as a methane product stream.

* * * * *